Sept. 13, 1938. H. ESPINOSA 2,130,179
BRAKE EQUALIZER
Filed April 12, 1937 3 Sheets-Sheet 2
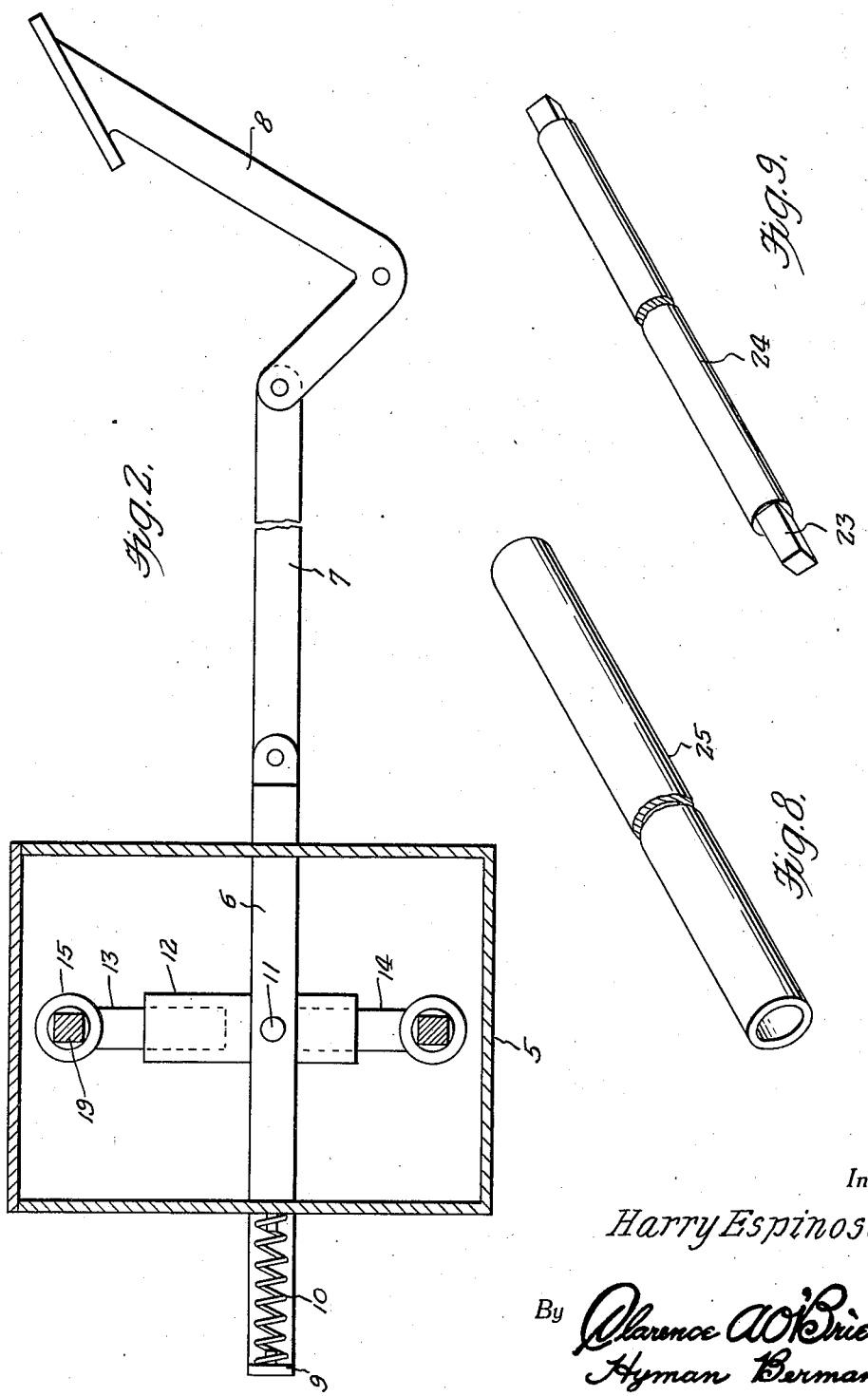
Inventor
Harry Espinosa,
By Clarence A. O'Brien
Hyman Berman
Attorneys

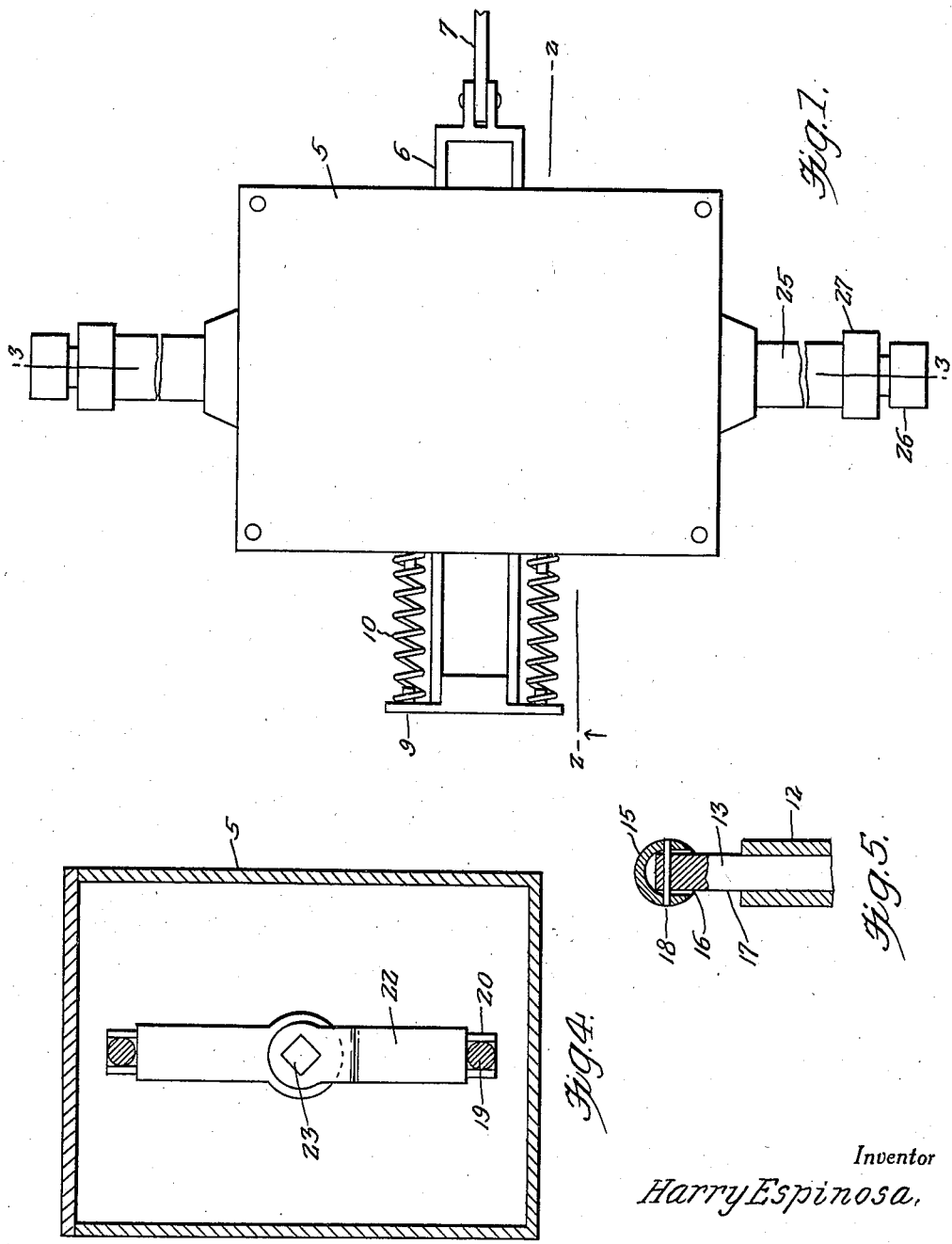

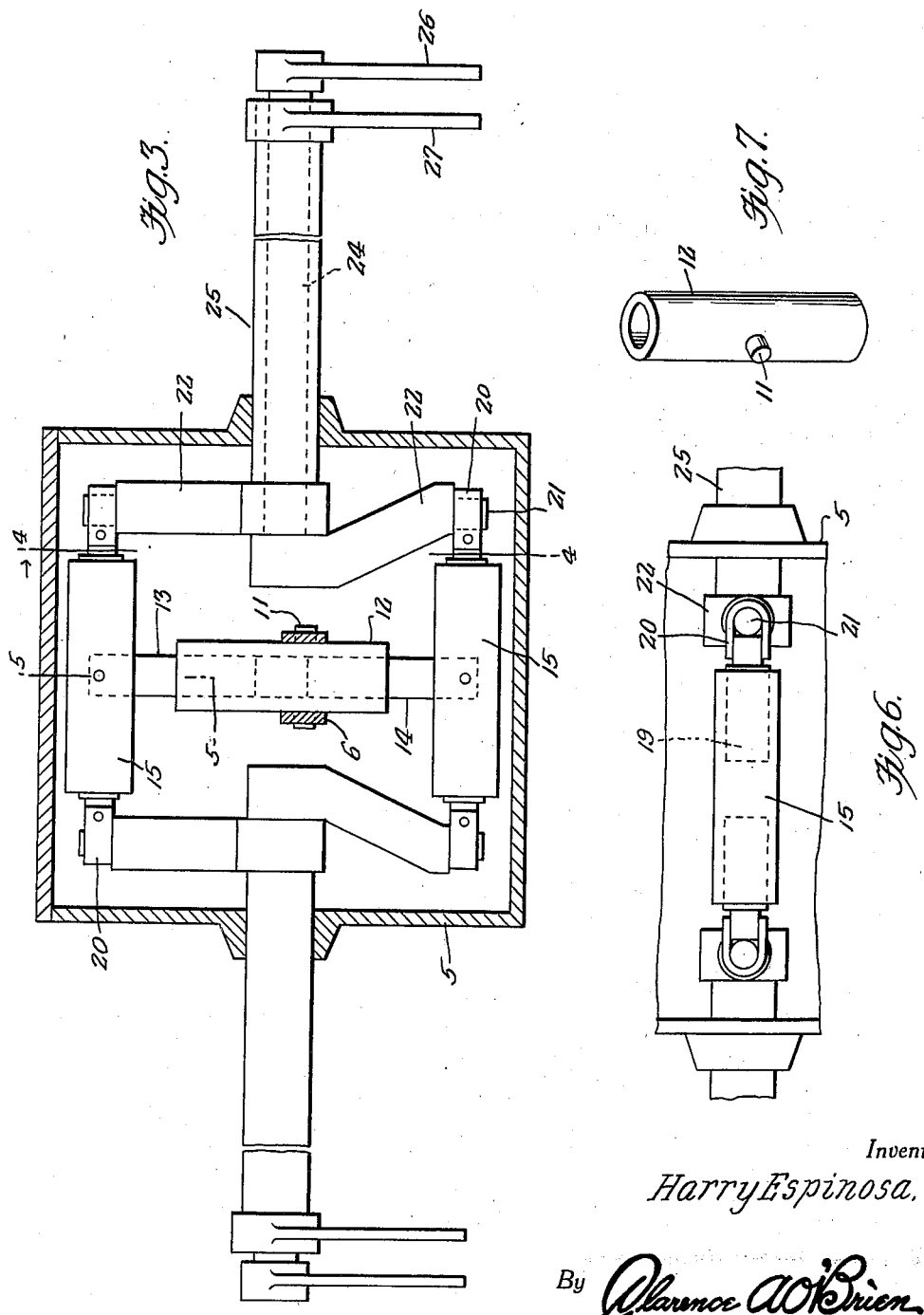

Patented Sept. 13, 1938

2,130,179

UNITED STATES PATENT OFFICE 2,130,179

BRAKE EQUALIZER

Harry Espinosa, North Bergen, N. J.

Application April 12, 1937, Serial No. 136,424

4 Claims. (Cl. 188—204)

The present invention relates to brake equalizers adapted for use in connection with mechanical brakes and has for its principal object to provide equal braking pressure on each of the brake shoes.

A further object is to provide a device of this character which may be installed in operative position upon the automobile without necessitating any material changes in the construction or operation thereof, which at the same time is efficient and reliable in operation, relatively inexpensive to manufacture and otherwise well adapted for the purpose of which the same is intended.

Other objects and advantages reside in the details of construction and operation as more fully hereinafter described and claimed, reference being had to the accompanying drawings forming part hereof, wherein like numerals refer to like parts throughout and in which:—

Figure 1 is a top plan view of the housing for the equalizing mechanism.

Figure 2 is a sectional view taken substantially on a line 2—2 of Figure 1.

Figure 3 is a sectional view taken substantially on a line 3—3 of Figure 1.

Figure 4 is a sectional view taken substantially on a line 4—4 of Figure 3.

Figure 5 is a fragmentary sectional view taken substantially on a line 5—5 of Figure 3.

Figure 6 is a side elevational view of one of the crank arm connecting members.

Figure 7 is a perspective view of the tubular connecting member between the pedal actuating rod and the pair of T-members forming the connection with the crank arm.

Figures 8 and 9 are perspective views of the outer and inner members respectively forming one pair of rock shafts.

Referring now to the drawings in detail, wherein for the purpose of illustration I have disclosed a preferred embodiment of the invention the numeral 5 designates a substantially rectangular housing secured in a suitable position beneath the floor of an automobile and through which a frame member 6 extends for horizontal sliding movement, one end of the frame member having a link 7 attached thereto forming a pivotal connection with a foot pedal 8, the opposite end of the frame member having shoulders 9 forming abutments for expansible coil springs 10 interposed between the shoulders and the adjacent side of the casing to normally maintain the brake pedal in a brake releasing position.

The portion of the frame 6 positioned within the housing is formed with aligned openings for pivotally receiving trunnions 11 formed intermediate the ends on the opposite sides of a cylindrical tubular member 12, said tubular member being positioned vertically within the housing and having upper and lower T-members 13 and 14 slidably inserted in the upper and lower ends of the tubular member, respectively.

Each of the T-members 13 and 14 includes tubular cross-heads 15—15 having lateral openings 16 within which the stem portions 17 of the T-members extend for pivotal connection to the cross-heads by pins 18, the free ends of the stem members 17 being slidably inserted in the tubular member 12.

Within each end of the upper and lower T-members 13 and 14 are slidably positioned pins 19 having one end projecting outwardly from the cross-heads and pivotally connected to yokes 20—20 which embrace the reduced ends 21 of cranks 22 in a manner as will be clearly apparent from an inspection of Figures 3 and 6 of the drawings.

The cranks 22 connected to the lower T-member 14 are secured to the squared ends 23 of a pair of rock shafts 24 extending oppositely through the side walls of the casing 5 and rotatably supported within tubular rock shafts 25 journaled in the walls of the housing. The inner ends of the tubular rock shafts 25 have the cranks 22 attached thereto for connection with the upper T-member 13. The outer ends of the rock shafts 24 and 25 have arms 26 and 27 attached respectively thereto and to which the front and rear brake rods are connected for the operation of the brakes.

Upon application of the brake pedal in a manner to apply the brakes, the rod or frame 6 will be moved in a forward direction thus exerting a forward pull on the tubular member 12 which in turn forces the upper and lower T-members forwardly to apply the pressure to the cranks 22 at each end of the heads 15 of the T-members.

It will be apparent from the foregoing that universal pivotal connection is provided between the brake pedal operating rod or frame 6 and the cranks 22 to which the rock shafts 24 and 25 are attached whereby to compensate for unequal resistance of the respective brakes and thus enable the pressure exerted upon the foot pedal to be evenly and equally applied to the brakes. The sliding action between the tubular member 12, the T-members 13 and 14 and between the T-members and the cranks 22 enable variations in the throw of the various cranks to permit this equalizing action.

It is believed the details of construction and operation of the device will be readily understood from the foregoing without further detail explanation thereof.

Having thus described the invention what I claim is:—

1. A brake equalizer comprising a housing, rock shafts journaled in opposite sides of the housing and projecting therefrom, each of said shafts including a pair of co-axial independently rotatable shaft members, front and rear brake rods connected to the outer ends of the shafts, a pedal actuated member extending from the housing, crank arms attached to the inner ends of the shafts, a tubular member pivotally connected to the pedal actuated member and positioned transversely thereof, T-members slidable in the ends of the tubular member, said T-members including pivoted tubular heads, pins slidable in the ends of the heads and yokes pivotally connecting the outer ends of the pins to the respective cranks.

2. A brake equalizer comprising a housing, rock shafts journaled in opposite sides of the housing and projecting therefrom, each of said shafts including a pair of co-axial independently rotatable shaft members, front and rear brake rods connected to the outer ends of the shafts, a pedal actuated member extending from the housing, crank arms attached to the inner ends of the shafts and means operatively connecting the pedal actuated member to said crank arms for oppositely actuating the associated shaft members, said means providing a universal pivoted connection between the cranks and the pedal actuating member, said means including inter-engaging members having relative sliding movement and providing a universal pivoted connection between the cranks and the pedal actuated member.

3. A foot-pedal controlled brake equalizing structure of the class described comprising a housing, a plurality of crank shafts journaled for oscillation in bearings in opposed walls of said housing, the crank arms on said shafts being confined for operation within the limits of said housing, operating members on the outer ends of said shafts adapted for operative connection with front and rear brake rods, a frame member slidably mounted in said housing, a brake pedal operatively connected with said frame member, a tubular member swingably supported on said frame member and located in said housing, and self-adapting operating connections between said tubular member and crank arms whereby to provide for simultaneous equalized operation of said crank shafts.

4. A brake equalizing device of the class described comprising a housing provided in opposed walls with bearings, opposed pairs of co-axial independently rotatable shaft members mounted for oscillation in said bearings, said shaft members extending into the housing and being provided with opposed sets of crank arms, independent rocker members on the outer ends of said shaft members for cooperation with front and rear brake rods, a pedal controlled frame slidably mounted in said housing, connecting and operating members between the respective sets of crank arms, and self-adapting operating connections between said last named members and said frame.

HARRY ESPINOSA.